United States Patent
Wloszek

[11] 3,713,555
[45] Jan. 30, 1973

[54] CONVEYOR
[75] Inventor: Joseph T. Wloszek, Cuyahoga, Ohio
[73] Assignee: Custom Machine, Inc., Cleveland, Ohio
[22] Filed: Jan. 22, 1971
[21] Appl. No.: 108,807

[52] U.S. Cl. ............................................. 214/339
[51] Int. Cl. .............................................B65h 51/26
[58] Field of Search............................214/338, 339

[56] References Cited

UNITED STATES PATENTS

| | | | |
|---|---|---|---|
| 1,319,000 | 11/1919 | Holbein | 214/339 X |
| 2,635,733 | 4/1953 | Reichl | 214/339 |
| 2,758,706 | 8/1956 | Quinlan | 214/339 |

FOREIGN PATENTS OR APPLICATIONS

| | | | |
|---|---|---|---|
| 1,122,746 | 8/1968 | Great Britain | 214/338 |

Primary Examiner—Robert G. Sheridan
Attorney—Meyer, Tilberry and Body

[57] ABSTRACT

A conveyor for simultaneously rotating and advancing cylindrical articles, such as lengths of pipe along a predetermined path of movement. Rollers having substantially spherical surfaces are mounted in two spaced parallel rows with the planes of rotation of the rollers in each row being parallel to each other. Roller drive is by a cylindrical member rotating on a fixed axis engaging the two rows of rollers from below, while the conveyed pipe lies in the trough formed by the two rows of rollers. The angle of the planes of rotation of the two rows can be simultaneously varied in opposite directions about an axis through the pipe by a pair of oppositely movable operating members extending the length of the conveyor and the mounting means are interconnected for simultaneous angle variation.

1 Claim, 4 Drawing Figures

PATENTED JAN 30 1973

INVENTOR.
JOSEPH T. WLOSZEK
BY
Meyer, Tilberry & Body
ATTORNEYS.

INVENTOR.
JOSEPH T. WLOSZEK
BY
Meyer, Tilberry & Body
ATTORNEYS.

INVENTOR.
JOSEPH T. WLOSZEK
BY
Meyer, Tilberry & Body
ATTORNEYS.

CONVEYOR

BACKGROUND OF THE INVENTION

The present invention is directed toward the conveyor art and, more particularly, to an improved power conveyor adapted for simultaneously rotating and advancing elongated cylindrical objects along a predetermined path.

The invention is especially suited for conveying sections of pipe through an ultrasonic testing machine and will be described with particular reference thereto; however, it will be appreciated the invention is capable of broader application and could be utilized for conveying substantially any type of elongated cylindrical article.

The conveyor most commonly utilized for conveying pipe sections comprises two parallel rows of wheels or rollers positioned adjacent the intended path of article movement. The wheels in each row are arranged so that their planes of rotation are parallel and intersect the path of movement of the pipe at an angle thereto. The rows are spaced from one another a distance sufficient to allow the outer peripheries of their respective rollers to cooperate to support the pipe, i.e., the two rows of rollers, in effect, define an imaginary trough. By rotating the rollers in each row simultaneously and in the same direction, the pipe section positioned on the rollers is rotated by frictional engagement with the rollers. By simultaneously changing the angle of the planes of rotation of the rollers about an axis of rotation through the pipe in opposite directions, the pipe can be made to move along the imaginary trough along a helical path.

The main problem or disadvantage with the above-discussed prior art conveyor is that it requires a somewhat complicated drive arrangement. For example, the normal drive structure has drive shafts connected between each of the adjacent rollers in each row by a pair of universal joints. As a consequence, for a conveyor of any substantial length the number of universal joints required becomes substantial, i.e., nearly double the number of rollers utilized. This greatly increases the first cost of the conveyor, as well as the maintenance and repair costs. Additionally, these conveyors are somewhat difficult to adjust for varying pipe sizes.

SUMMARY OF THE INVENTION

The present invention provides a conveyor of the general type described which overcomes the above-mentioned problems and permits use of an extremely simple drive arrangement. Further, conveyors formed in accordance with the present invention accommodate a wide range of sizes and can be easily adjusted for a variety of conveying speeds.

In accordance with the invention a conveyor of the type described is provided wherein the rollers are rotated by means of a driven cylindrical member extending the length of the conveyor which frictionally engages at least one (and preferably both) row of rollers and preferably from the lower side. A common actuating member is associated with each row of rollers so associated that they simultaneously change the plane of rotation in opposite directions in the same amount.

OBJECTS

Accordingly, a primary object of the present invention is the provision of an improved conveyor of the type described which has a highly simplified drive arrangement.

Another object of the invention is the provision of a conveyor of the general type described which is simple in construction and wherein frictional drive engagement is a function of the weight of the conveyed article.

A still further object is the provision of a conveyor which is especially suited for conveying elongated cylindrical articles along a linear path while rotating the articles about their longitudinal axes.

Yet another object of the invention is the provision of an improved conveyor of the type described which can be constructed at low cost and is simple to maintain.

DRAWINGS

These and other objects and advantages will become apparent from the following description when read in conjunction with the accompanying drawings wherein.

DESCRIPTION

Figure 1:
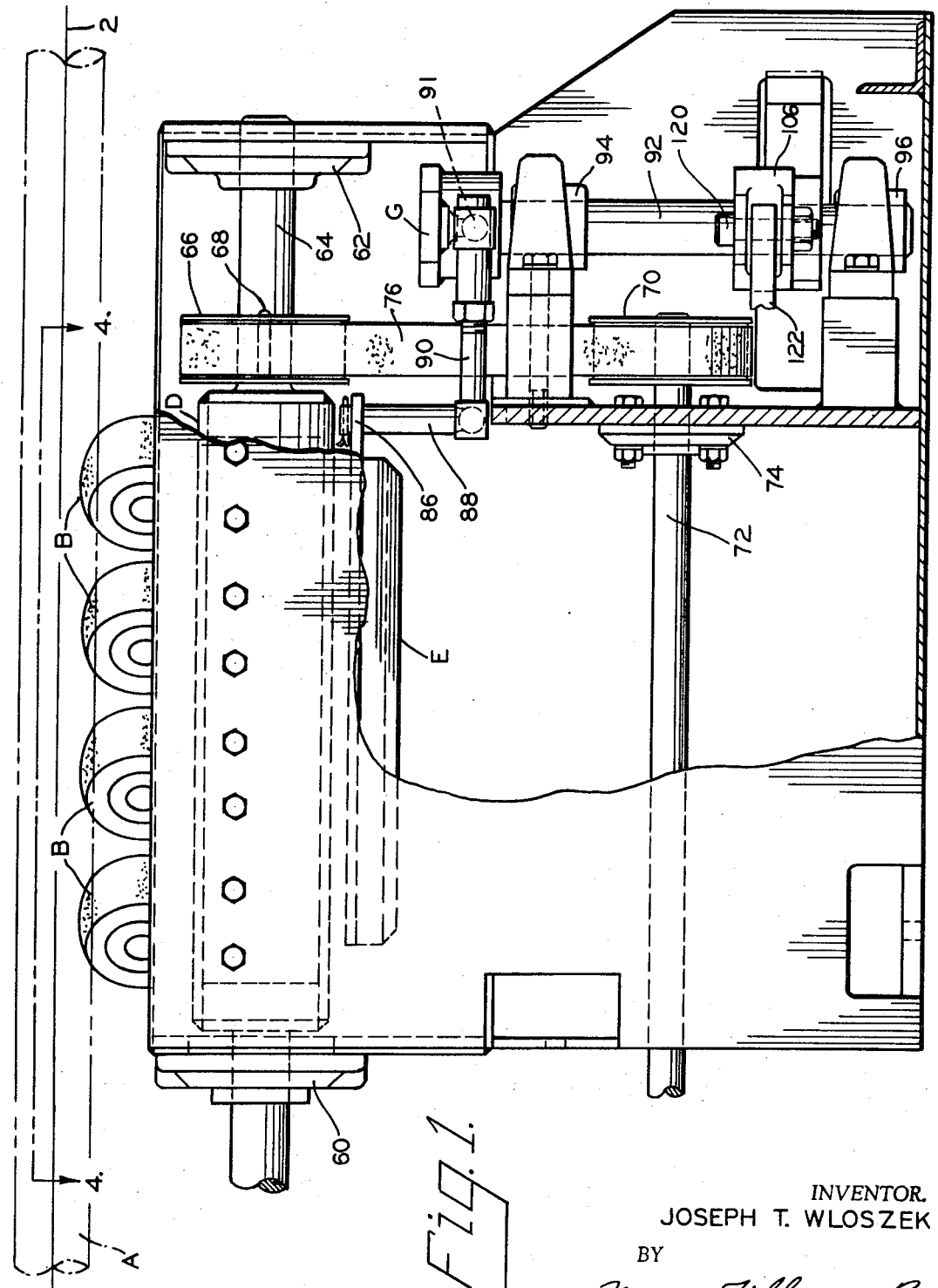
FIG. 1 is a side elevation view of a conveyor made in accordance with this invention.

Referring now to the drawings wherein are showings for the purposes of illustrating the preferred embodiment of the invention only and not for the purposes of limiting same, the figures now a cylindrical article A being conveyed on roller members B and C arranged in two parallel rows, the rollers in a given row arranged to rotate in parallel planes of rotation. The spherical peripheries of the roller members rest on a drive drum D. The angle between the path of lineal movement of article A and a plane of rotation of a roller member determines the speed of lineal movement, and that angle is variable for all roller members simultaneously by actuator connectors E and F connected with pivoted lever G, a cylinder H being connected to operate lever G.

Figure 2:
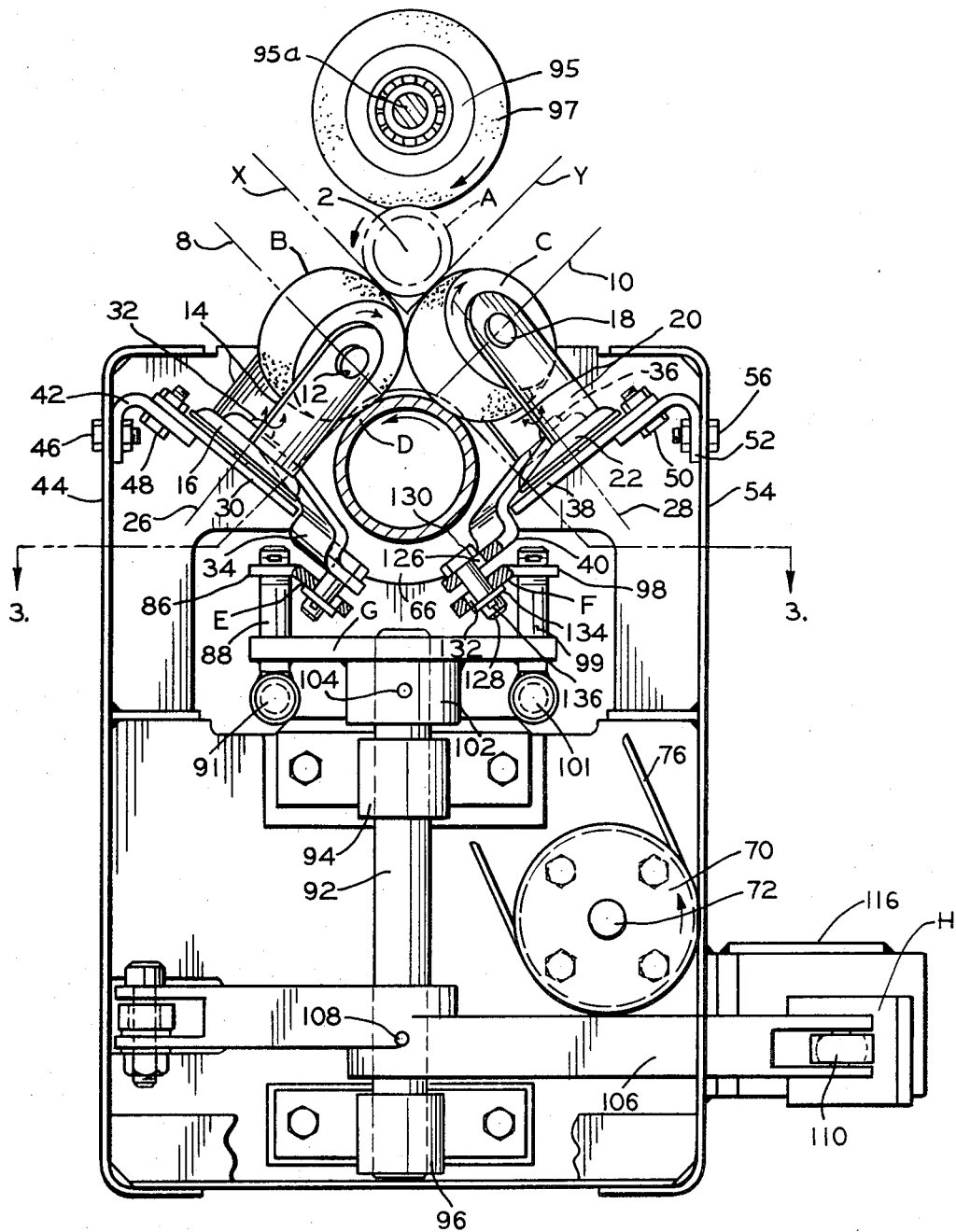
FIG. 2 is an end elevation view of the conveyor shown in FIG. 1, as seen from the drive end.

Referring now to the drawings in detail, cylindrical article A is moved or conveyed along a predetermined path 2 which is perpendicular to the plane of the paper as seen in FIG. 2 and is parallel to the drive drum as seen in the remaining figures of the drawing and as will be described in detail below. When the conveyed article A is in motion as provided by a conveyor made according to this invention, the movement of any given point on the surface of cylindrical object A describes a helical path.

Figure 4:
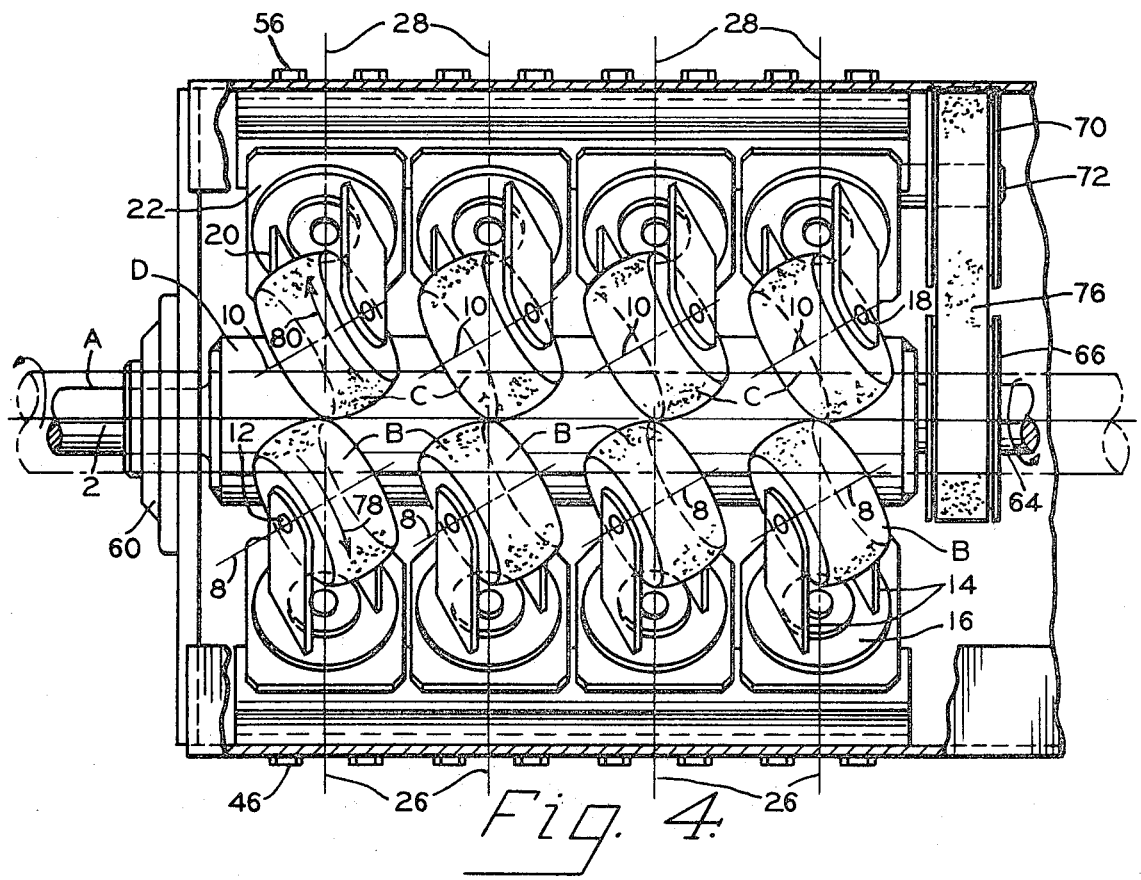
FIG. 4 is a top plan view of the invention shown in FIG. 1, being substantially a view from the plane of line 4—4 of FIG. 1.

The conveyed article A rests by gravity on a plurality of roller members B and C, these being mounted for rotation in two rows as is best seen in FIGS. 2 and 4. Thus, a plurality of roller members B are arranged in one row, and a plurality of rollers C are arranged in another row. The spacing of the two rows and the diameters of the roller members are such that the smallest cylindrical member which the machine will be called upon to convey cannot fall between the two rows of roller members. The conveyed article lies in what is in effect a trough formed by the two tangents at the points of contact between article A and roller member B on the one hand, and article A and roller member C on the other hand. Such a trough, which of course is imaginary, is shown by the intersecting lines X and Y in FIG. 2.

Each of the roller members B and C is provided with a surface which is a segment of a sphere. Moreover, each of the roller members B in the row defined by them rotates in a plane which is parallel to the plane of rotation of each of the other roller members in that row. Similarly, each roller member C rotates in a plane parallel to the plane of rotation of each of the other roller members C in that row. This parallel relationship of the planes of rotation of the roller members in each row is best appreciated by reference to FIG. 4. Each of the roller members B is mounted to rotate about an axis 8, and each of the roller members C is mounted to rotate about an axis 10. Axis of rotation 8 is provided by a suitable shaft one end of which is shown at 12. Shaft 12 is mounted in brackets 14 which in turn are mounted on a base 16. Similarly, the axis of rotation 10 for roller members C is provided by a suitable shaft 18 mounted in brackets 20, brackets 20 in turn being supported on a base 22.

Referring now specifically to FIG. 4, the angle which the plane of rotation of each roller makes with the predetermined path of movement of the cylindrical objects to be conveyed will determine the speed and direction of movement of the conveyed article. For reference convenience, the predetermined path of movement is identified by reference character 2, as aforesaid.

Reference was made above to the angle which the plane of rotation of a roller makes with the predetermined path of movement of the conveyed article. In order that the machine operator may control the speed and direction of movement of the conveyed article, the aforesaid angle is variable. In order to provide for such variation of the angle, the rollers B and C are mounted so that the plane of rotation can be selectively pivoted about axes at attitude or attitudinal axes which intersect close to or on the center of rotation of article A. Thus, each roller B has a pivot axis 26 about which its base 16 is mounted for oscillation. Similarly, each roller C has a pivot axis 28 about which its base 22 is mounted to be oscillatable.

Each base 16 for its corresponding roller member B is rotatably mounted to oscillate on a base bracket 30 by means of a suitable pin 32 extending through each. Each base 16 is provided with an actuator arm 34 secured to the base so that movement of arm 34 accomplishes movement of base 16 about the attitudinal axis 26.

Similarly for roller members C, the bases 22 are rotatably supported on base bracket 38 by a pin 36 extending through each. An actuator arm 40 is fixed to base 22 in order that movement of actuator arm 40 will oscillate base 22 about the attitudinal axis 28 provided by pin 36 in engagement with its base bracket 38.

Each of the base brackets 30 is mounted on the basic frame of the machine by means of a frame bracket 42 secured to the side frame member 44 in any suitable manner, as for example by a threaded member 46. Base bracket 30 is, in turn, secured to frame bracket 42 loosely by a suitable securing means, as for example by a threaded member 48. If the axes of rotation 8 and 10 of roller members B and C were rigidly fixed in relation to the drive means, it would be virtually essential that all of these relationships be provided with a high degree of accuracy. Such a high degree of accuracy would make also for a high cost of manufacturing. It is therefore desirable that the roller members B and C be mounted to rotate upon axes which have a limited amount of vertical movement so that the roller members may accommodate themselves to slight irregularities in size and to slight misalignments of the various elements of the mechanism involved. There is a further advantage in such loose mounting means in that such a method of mounting the roller members B and C makes it possible for the roller members to engage the drive by gravity, and further makes it possible for the conveyed article A to be supported by the drive member through the two roller members B and C, with the result that the frictional engagement between conveyed article A and the roller members, and between the roller members and the drive, is a function of the weight of the conveyed article.

To accomplish the objectives outlined in the foregoing paragraph, the threaded members 48 which secure base brackets 30 to their corresponding frame brackets 42 are a nut and bolt connection (as here shown) and this nut and bolt connection is not pulled up tight, but rather, is put together so as to leave some looseness between the base bracket 30 and the frame bracket 42. Threaded fasteners of this type, which can be secured against loosening and total disengagement of the nut from its bolt are generally available in commerce and need not be detailed here. It will suffice to point out that sufficient looseness is provided in the assembled condition of base bracket 30 on frame bracket 42 by means of threaded member 48 so that the base bracket 30 is provided with a limited amount of angular movement about its support, this angular movement referred to being in the plane of the paper as seen in FIG. 2 so that the roller member B has a limited amount of movement in the vertical direction.

Similarly, each roller member C is mounted for a limited amount of vertical movement by means of a threaded member 50 loosely securing the base bracket 38 to a frame bracket 52, frame bracket 52 in turn being secured to a side frame member 54 by any suitable means, as by threaded members 56. The looseness referred to above could be provided in both of the elements 46, 48 and in both of the elements 50 and 56. However, in order to establish a better degree of control, a preferred embodiment of the invention has been constructed and successfully treated wherein all of the looseness (sometimes referred to in the trade as "-slop") is provided in the connection of the base brackets 30 and 38 with their frame brackets 42 and 52 respectively.

The looseness in the mounting of base brackets 30 and 38 referred to above admits of a gravity engagement by roller members B and C with the drive means, which will be described at this time. The conveyor machine could be operated to drive the conveyed article in either direction by driving only one row of rollers, i.e., either the row B or the row C, or in fact, even by driving only one of the rollers in one of the rows. However, for the purpose of balancing forces on the various elements of the machine and for the purpose of establishing a greater degree of control and to avoid wear or abrasion which might occur if only one roller or if only one row of rollers did all of the driving, the preferred embodiment here shown is so constructed that each of the rollers B and C is in contact with the drive drum D and serves to engage the conveyed article A in a driving relationship. Drive drum D is thus mounted for rotation about an axis fixed relative to the frame, the mounting being in suitable bearings indicated generally at 60 and 62, these bearings carrying a shaft 64 onto which the drive drum B is secured. A driven pulley 66 is mounted on shaft 64 and is keyed to the shaft by a key 68. A drive pulley 70, aligned with pulley 66, is secured on a drive shaft 72 which is mounted in the frame by suitable bearings, one of these being indicated generally at 74.

Drive shaft 72 can be powered by any of a number of conventional drives, and such a drive need not be detailed here. It will be understood that the drive for the shaft 72 may be variable in direction or in speed or both. Whether or not such degrees of control of shaft 72 are desired may depend to some extent on the use to which the conveyor is put. In may applications of a conveyor made according to this invention, it will not be necessary to make the drive of shaft 72 variable in any way, because a large degree of control both as to speed and direction can be exercised by controlling the attitude of rollers B and C to the drive drum D and to the conveyed article A. Pulley 70 drives pulley 66 by means of a suitable drive belt 76 passing over the two pulleys and engaging them with a sufficient degree of tightness to accomplish the required drive. Again, it may be observed that any suitable conventional means of connecting drive shaft 72 with the drive drum D may be provided. Belt drives such as the one here shown have been found to be economical and practical in such applications as this and such a belt drive is shown in the preferred embodiment here illustrated.

Reference is made to the attitude of the drive rollers B and C to the drive drum D and to the conveyed article A. This "attitude" is the angle which the plane of rotation of a drive roller makes as it intersects the predetermined path of movement 2 of the conveyed article. Thus, in the view shown in FIG. 4, if the rotational axes 8 and 10 of roller members B and C were to be rotated clockwise as seen in FIG. 4 until they appeared, as seen in FIG. 4, to be parallel to the path of movement indicated at 2, in that attitude the plane of rotation of each roller member B and C would be perpendicular to the line 2 and there would be no movement right or left of the conveyed article A, regardless of the direction of rotation of the roller members B and C. However, if the attitude of the roller members B and C is as shown in FIG. 4, and if further the roller members B and C turn in the direction indicated by arrows 78 and 80 respectively, drive of the conveyed article will be from right to left as seen in FIG. 4.

The mode of changing the attitude of the drive rollers B and C will now be discussed in detail. The attitude of each of the drive rollers could be adjusted individually, but it will be more convenient and will establish a higher degree of control over the conveyed article to coordinate the movement of roller members B and C about their attitudinal axes so that the machine operator can change the attitude of all of the roller members B and C simultaneously.

To accomplish the simultaneous change of attitude of the roller members B and C, the structure in the preferred embodiment shown includes an actuator connector E which is here shown as an elongated member having engagement with each of the actuator arms 34 for simultaneous control of the attitude of each of the roller members B. Similarly, an actuator connector F engages each of the actuator arms 40 for simultaneous control of the attitude of roller members C.

The means by which actuator connectors E and F engage their respective actuator arms 34 and 40 will now be described. Because the angle which actuator arm 40 presents to the observer in FIG. 2 lends itself more readily to a detailed description, the actuator arm 40 and the actuator connector F are broken away and shown partially in section, and it will be understood that the means by which actuator arms 34 are connected with actuator connector E are similar to the means detailed in connection with actuator arms 40 and actuator connector F.

Actuator connector E is provided with an ear 86 which may threadedly engage a post 88 connected with lever G by a link 90 and a ball joint 91. Lever G is mounted on a shaft 92 which is pivotable in suitable bearings 94 and 96 secured in any conventional manner to the basic frame structure. Similarly, for simultaneous control of the attitude of each of the roller members C, the actuator connector F is provided with an ear 98 which engages a post 99, post 99 being connected also with lever G by a link 100 and a ball joint 101. Thus, with posts 88 and 99 both connected with lever G for simultaneous actuation with and by lever G, the two rows of roller members B and C are interconnected so that the variation of their attitude is accomplished in a coordinated manner. In the embodiment here shown, lever G is secured to a hub 102 which is provided with a set screw 104 whereby lever G is pivoted as the shaft 92 pivots.

A second lever 106 is secured on shaft 92 by means of a set screw 108. Lever 106 is connected to be operated by any suitable power device, preferably by a pneumatic device of a conventional type. To accomplish such operation of second lever 106, the second lever is connected at 110 with the connecting rod 112 of the aforesaid pneumatic cylinder H; cylinder H is pivotally mounted at its left end as seen in FIG. 3 on the frame of the conveyor by means of a bracket 116 and a pivot pin 118, such mountings being conventional.

Figure 3:
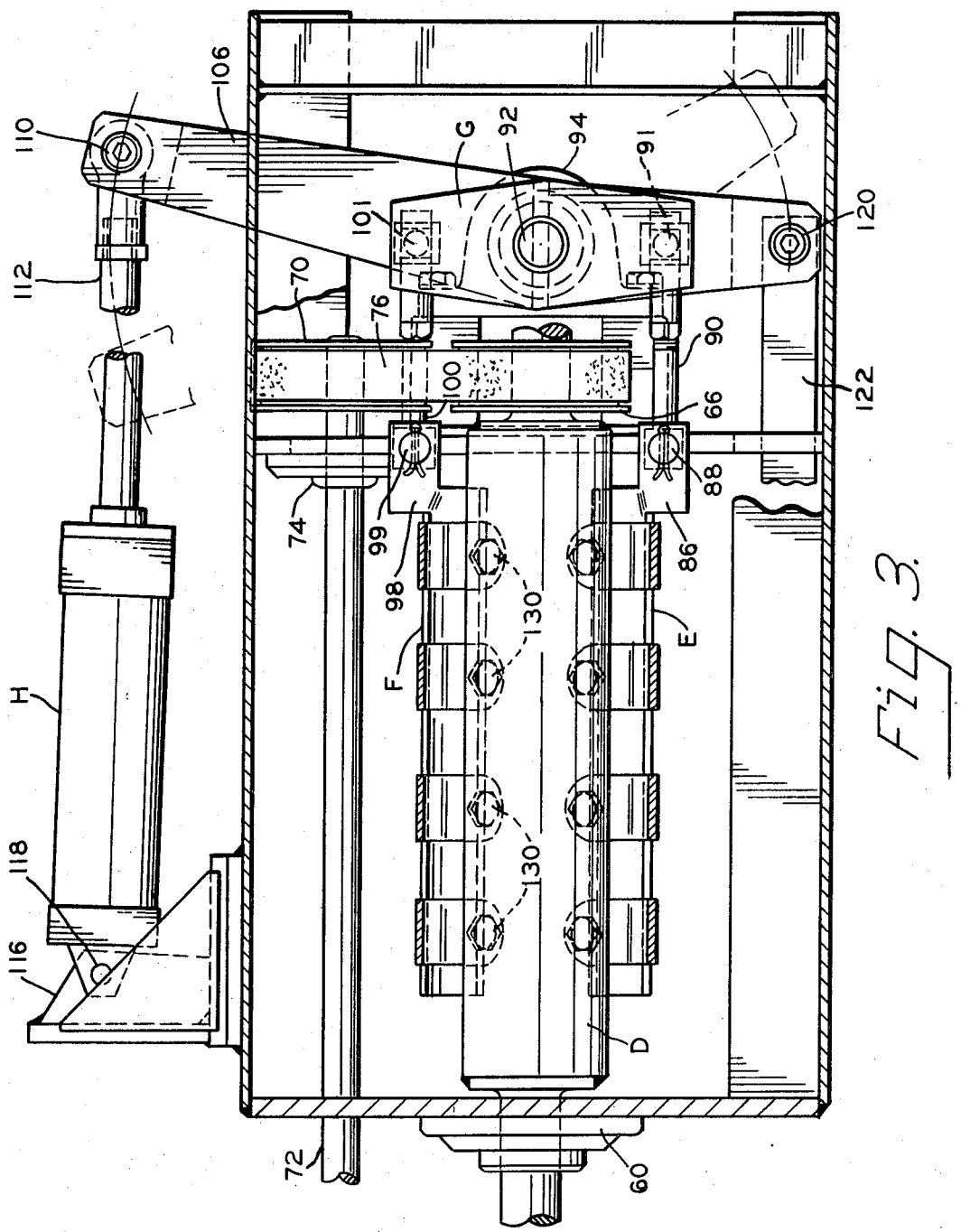
FIG. 3 is a view in section substantially on line 3—3 of FIG. 2.

Looking at FIG. 3 of the drawings, the aforesaid connection 110 with the pneumatic cylinder is at the upper edge of the figure. Near the lower edge of FIG. 3, lever 106 is connected at 120 with an element 122, for which no further connection is here shown. For the purpose of indicating some of the refinements in controls which may be incorporated with a conveyor of this type, it will suffice to indicate that portions of the element 122 not shown here may if desired be connected with any suitable stop means which in turn may be adjustable and may be calibrated in terms of attitude angle, feet per minute, or the like depending upon the particular application to which the conveying machine is put. Alternatively, the element 122 may connect with the second lever of a similar conveying machine which is axially aligned with a conveying machine such as that here shown and cooperable therewith to permit of simultaneous variation of the attitude angles of the several connected conveying devices.

The description will now deal in detail with the connection of the actuator arms 34 and 40 to their respective actuator connectors E and F. The detailed connection of one actuator arm 40 with its actuator connector F is disclosed in FIG. 2 and will be described here and it will be understood that all of the actuator arms 34 and 40 are similarly connected.

Each of the actuator arms is provided with a slotted opening such as that shown at 126 in FIG. 2, the width of the slot being approximately the same as the shank of a pin 128 extending through the slot and kept from falling through the slot by a head 130. Because of the slot 126, the shank 128 is permitted movement relative to the actuator arm 40, that movement being axial relative to the arm 40 rather than transverse thereof. The shank 128 also passes through a slot 132 in the actuator connector F, slot 132 being transverse of the long axis of actuator connector F. The shank 128 is provided at its lower end with a suitable washer 134 held in place by any conventional device such as a cotter pin 136. Thus, in the embodiment shown, the actuator connectors E and F are supported by the washers on the pins which pass through the actuator arms. There is a space between the actuator connectors E and F and their associated actuator arms 34 and 40. That space is required by the looseness or "slop" in the connections of the elements referred to above and which will be discussed below in referring to the desirability of making the frictional engagement a function of the weight of the conveyed article.

Some of the geometrical relationships of various elements of a conveyor made according to this invention will now be considered in more detail. Reference has been made in the foregoing description to the spherical configuration of the peripheral surfaces of the rollers members B and C. The roller members are constructed and mounted so that their axes of rotation 8 and 10 pass through the centers of the respective spheres of the spherical surfaces which engage the drive drum D and the conveyed article A. Furthermore, the attitudinal axes 26 and 28 of the respective bases 16 and 22 pass through the centers of the spheres forming the peripheral surfaces. It is moreover pointed out here that each roller member is so mounted that a plane can be passed through the attitudinal axis of the roller member which is perpendicular to the path of movement of the conveyed article. All of such planes would be parallel to the plane of the paper of FIG. 2, and all of such planes would be perpendicular to the plane of the paper of FIG. 1 and likewise to the plane of the paper of FIGS. 3 and 4. Summing up this relationship, the geometry of the structure and the mounting means is such that the center of the sphere forming the peripheral surface of each roller member holds a fixed position regardless of the attitude of that roller member.

OPERATION

As is pointed out above, when the plane of rotation of each roller member is perpendicular to the path of movement indicated by the line 2, the conveyed cylindrical member A will rotate but will not move either way on the conveyor, regardless of the direction of rotation of the roller members B and C. Accordingly, the perpendicular relationship or attitude referred to may be taken as the zero angle or "no angle" position of the roller members. As the angle of the plane of rotation of each roller member increases from said "no angle" position to a position such as that shown in FIG. 4, with the roller members B and C turning in the directions indicated by arrows 78 and 80 respectively, the conveyed article will continue to rotate at the same speed but will move from right to left as seen in FIG. 4. As the angle of attitude referred to increases, the pitch of the helix described by any fixed point on the conveyed article A increases, so that the movement in terms of linear feet per minute of the conveyed article will increase. To an observer looking at FIG. 4, it would be evident that the planes of rotation of the roller members are inclined to the left. If now the attitude of the roller members is changed so that the planes of rotation are inclined to the observer's right as seen in FIG. 4, the conveyed article will move from left to right if the direction of rotation of roller members B and C remains the same.

The attitude of the roller members B and C is determined in the structure shown by the position of the first mentioned lever identified as G and perhaps best seen in FIG. 2. Each of the roller members is related to the lever G, the roller members B being related to lever G through the several elements 16, 34, E, 88, and 90, while the roller members C are related to the lever G through the elements 22, 40, F, 99 and 100. It will be apparent from FIGS. 2 and 3 that pivoting the shaft 92 clockwise as seen in FIG. 3 will increase the angle of attitude of the roller members B and C, as seen in FIG. 4. Conversely, a counterclockwise pivoting movement of shaft 92 as seen in FIG. 3 will decrease that angularity and will result in slowing down the linear motion of the conveyed article A, that motion becoming zero when the plane of rotation of each roller member is perpendicular to the predetermined path of movement indicated by line 2 on FIG. 4. If counterclockwise pivoting of shaft 92 is continued beyond this zero movement point, then the conveyed article will begin to move in the other direction, namely from left to right, for the same direction of rotation of the roller members B and C.

Reference was made above to a limited amount of looseness or "slop" in the mechanical connections securing the various movable parts of the mechanism together. Such looseness can be provided at one or more of a number of locations. Thus, specific reference was made to a looseness in the threaded members 48 and 50 which secure the base brackets 30 and 38 to their frame brackets 42 and 52 respectively. There is also a looseness in the connection of actuator arms 34 and 40 with their actuator connectors E and F respectively because of the pin and slot connections. The looseness referred to provides for a limited amount of movement of the roller members B and C relative to the drive drum D, with the result that the roller members may repose by gravity on the drive drum D; furthermore, in view of the aforesaid looseness, the weight of the conveyed article is transmitted through the roller members B and C to the drive drum D with the result that the frictional engagement of roller members B and C with the conveyed article on the one hand and with the drive drum on the other hand is a function of the weight of the conveyed article. The advantage in such a relationship is that a light weight conveyed article produces a lighter frictional contact with the frictionally engaged surfaces and thus produces less wear than would be the case if the relationship of roller members B and C were rigidly fixed relative to the drive drum D, because with such a rigidly fixed relationship, the frictional engagement between roller members B and C would be substantially constant regardless of the weight of the conveyed article.

The conveyor shown can include any number of pairs of rollers B, C from a single pair of rollers B, C driven by the drum D up to any number. Alternatively the conveyor can be made in a number of sections with each section including a number of pairs of rollers B, C and either the drum D of each section driven independently or preferably from the drum of the adjacent section. In the same way the angle of the planes of the rollers of each section may be individually controlled by independent actuators or preferably by interconnecting the actuators of each section. In some instances the sections remote from the work area may be adjusted to advance the article A at a faster speed than those closer, so that subsequent lengths of articles will catch up with the advance ones and will pass through the work area in end-to-end abutting relationship.

As above indicated the pivot axes 26,28 should preferably intersect generally on the center of rotation of the article A. Thus as the diameter of the article F increases, the rollers B, C should be spaced further and further apart which would normally require a larger and larger drive roll D. Obviously, two rolls D could be used one for each row of rollers B, C with the drive rolls driven at the same speed by suitable belts or chains.

In the embodiment shown, the rotational driving force between the conveyed article A and the rollers results from the frictional forces developed between the article A and the rollers due to the weight of the article. If this weight is insufficient, means may be provided which bear down on the top of the article and press it against the lower two sets of rollers. In FIG. 2 there is shown for example a disc 95 rotatably supported on a shaft 95a and having an edge or rim 97 of relatively thin flexible material such as rubber bearing against the top of the article A. Such rim exerts a downward force while at the same time flexing sufficiently to permit the helical movement of the conveyed article A relative thereto. Any number of such discs may be employed and power means can be used to vary the downward force of the disc on the article A.

The invention has been described with reference to a preferred embodiment. Obviously modifications and alterations will occur to others upon the reading and understanding of this specification. It is my intention to include all such modifications and alterations insofar as they come within the scope of the appended claims or the equivalence thereof.

I claim:

1. In a conveyor for conveying elongated cylindrical articles along a predetermined path and including frame means supporting at least two laterally spaced parallel rows of a plurality of roller members having axes of rotation and pivot axes perpendicular to their axes of rotation and extending toward said path, said roller members being arranged so that their outer surfaces define an article receiving trough and for rotation of said roller members about their axes of rotation to rotate articles positioned in said trough about their longitudinal axes and to move the articles along said path, the improvement comprising: the outer surfaces of each said roller members having radii of curvature peripherally and longitudinally relative to said axes of rotation to provide said outer surfaces with a spherical configuration, and drive means including at least one elongated driven shaft means extending parallel to said path and frictionally engaging and driving at least some of said roller members in single point contact with said outer surfaces thereof, the portion of said shaft means engaged by said roller members being of uniform diameter whereby single point contact is maintained upon pivotal movement of said roller members about their pivot axes and said path is maintained at a given elevation relative to the axis of said shaft means.

* * * * *